June 21, 1966          L. D. FEISEL          3,257,651
PULSE POSITION MODULATION INFORMATION HANDLING SYSTEM
Filed April 18, 1962          3 Sheets-Sheet 1
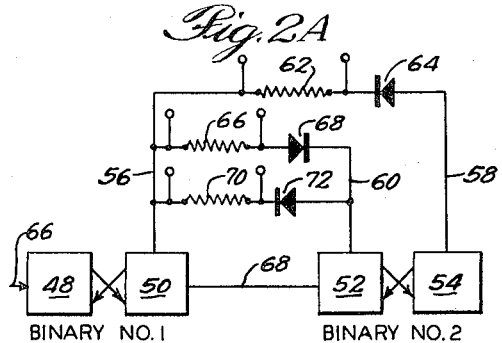
INVENTOR.
Lyle D. Feisel,
BY
Bair, Freeman & Molinare
ATTORNEYS.

June 21, 1966  L. D. FEISEL  3,257,651
PULSE POSITION MODULATION INFORMATION HANDLING SYSTEM
Filed April 18, 1962  3 Sheets-Sheet 2
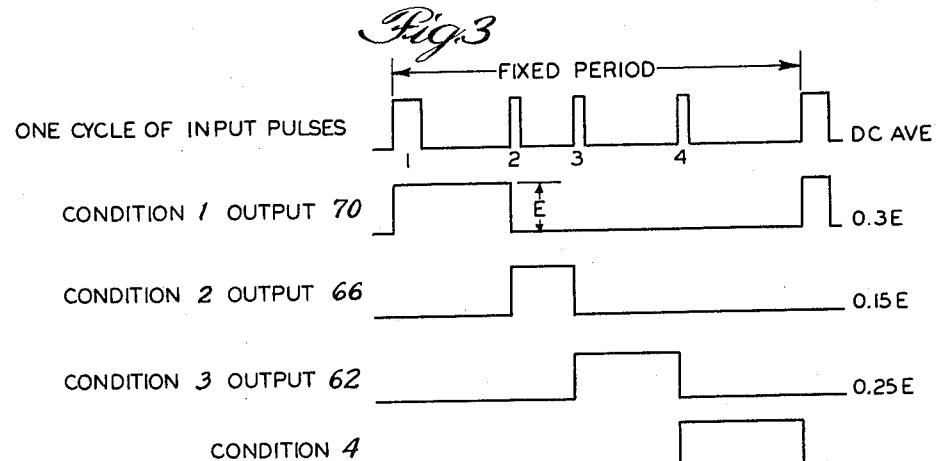
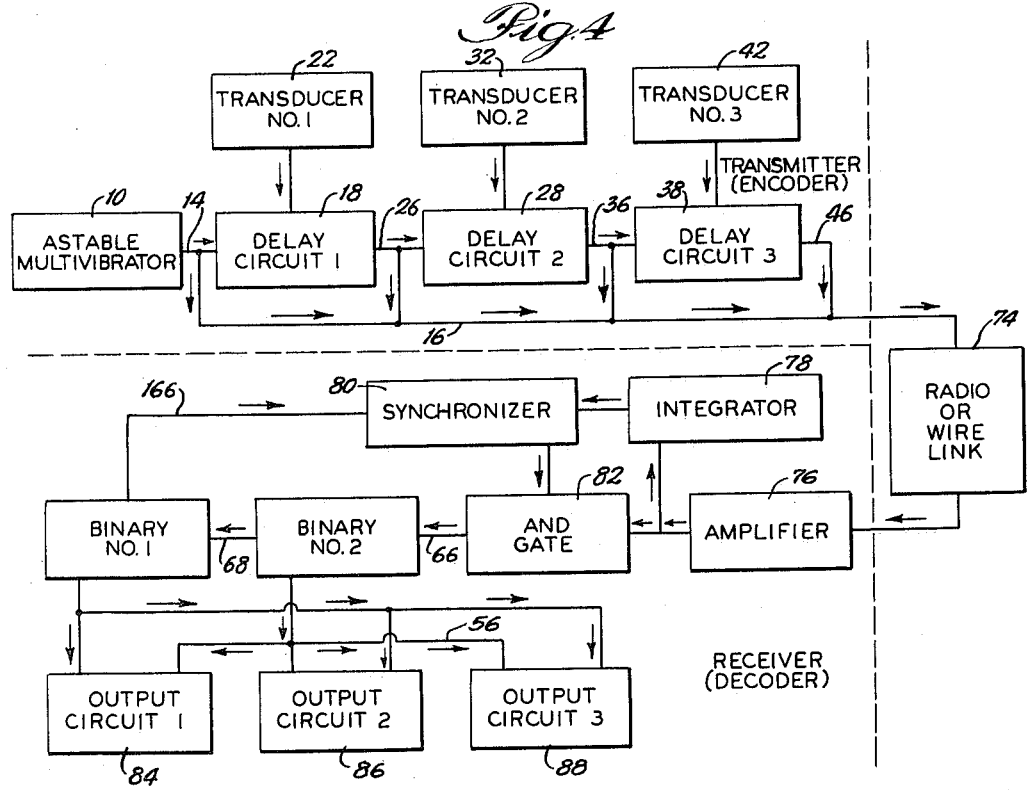
INVENTOR:
Lyle D. Feisel,
BY
Bair, Freeman & Molinare
ATTORNEYS.

June 21, 1966  L. D. FEISEL  3,257,651
PULSE POSITION MODULATION INFORMATION HANDLING SYSTEM
Filed April 13, 1962  3 Sheets-Sheet 3
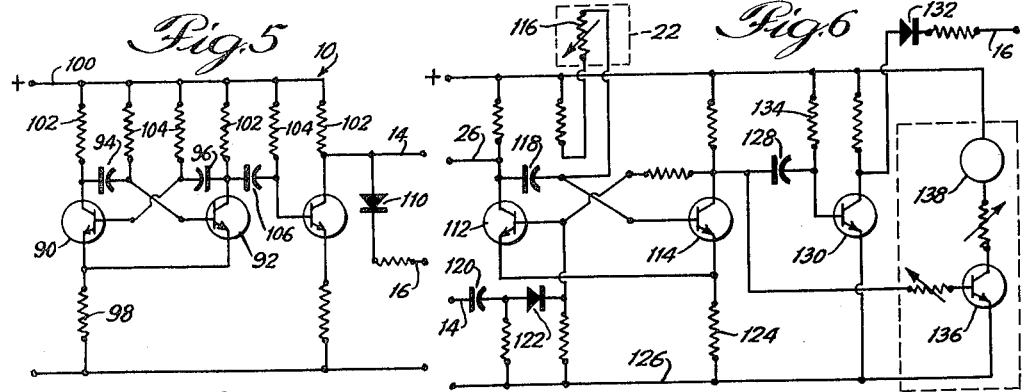
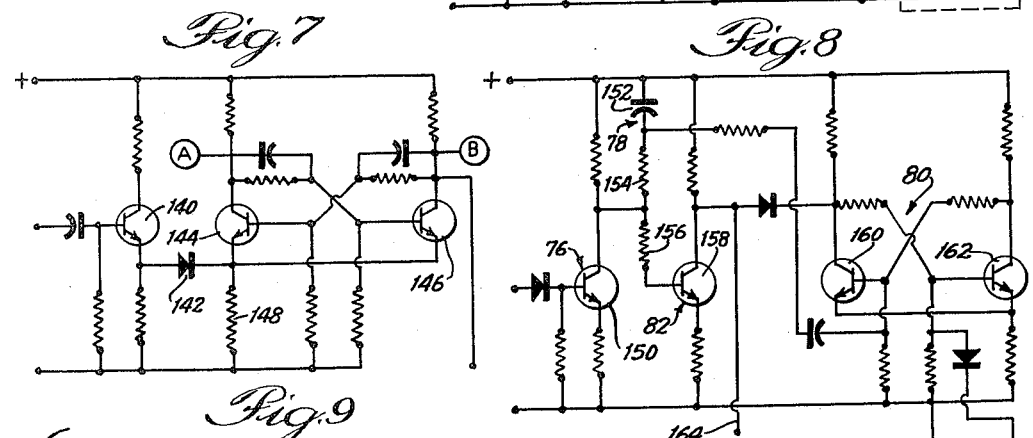
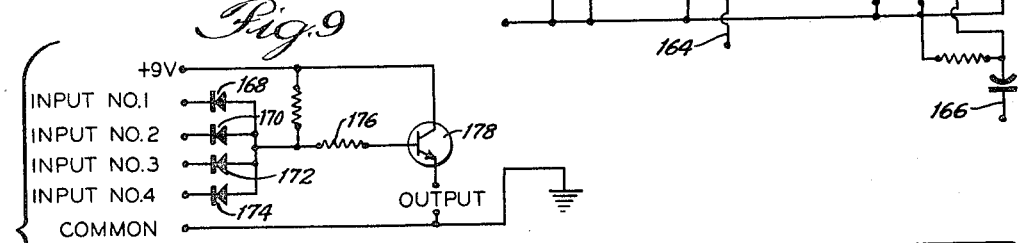
| INPUT NO. | OUTPUT CHANNEL NO. |  |  |  |  |  |  |  |  |  |  |  |  |  |  | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | |
| 1 | 1A | 1B | 1A | 1B | 1A | 1B | 1A | 1B | 1A | 1B | 1A | 1B | 1A | 1B | 1A | BINARY OUTPUT NO. |
| 2 | 2B | 2A | 2A | 2B | 2B | 2A | 2A | 2B | 2B | 2A | 2A | 2B | 2B | 2A | 2A | |
| 3 | 3B | 3B | 3B | 3A | 3A | 3A | 3A | 3B | 3B | 3B | 3B | 3A | 3A | 3A | 3A | |
| 4 | 4B | 4B | 4B | 4B | 4B | 4B | 4B | 4A | 4A | 4A | 4A | 4A | 4A | 4A | 4A | |
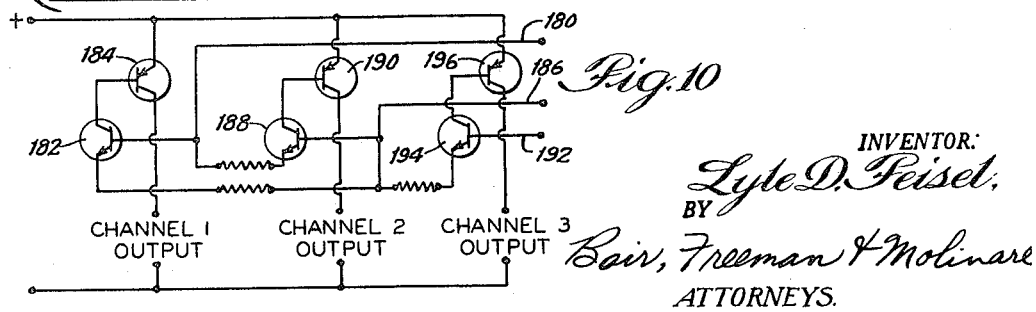
INVENTOR:
Lyle D. Feisel,
BY
Bair, Freeman & Molinare
ATTORNEYS.

United States Patent Office 3,257,651
Patented June 21, 1966

3,257,651
PULSE POSITION MODULATION INFORMATION
HANDLING SYSTEM
Lyle D. Feisel, 640 Pammel Court, Ames, Iowa
Filed Apr. 18, 1962, Ser. No. 188,463
7 Claims. (Cl. 340—183)

This invention relates generally to remote control systems and more particularly to a new and improved remote control system of the type utilizing pulse position modulation of electrical signals for transmitting proportional information data to a remote point through a radio or wire link.

While various types of remote control systems are known in the prior art, many such systems are characterized by a relatively high degree of cost and complexity which has limited their range of use. Attempts have been made heretofore to reduce these limitations of cost and complexity, and in general most prior relatively inexpensive remote control systems have been dependent upon some form of mechanical tuning. Since a major application of radio remote control systems resides in the control of vehicles, such as aircraft, which are subject to considerable vibration, the operation of mechanically tuned systems has often proved unsatisfactory.

Accordingly, it is a general object of this invention to provide a new and improved relatively inexpensive remote control system which overcomes the limitations of prior mechanically tuned systems.

It is another object of this invention to provide a new and improved remote control system having multiple channel capacity for the processing of proportional information which is free from mechanical motion except for the prime transducers and the indicating or controlling devices connected to the output of the system.

It is still another object of this invention to provide a new and improved remote control system of a compact and lightweight construction which readily lends itself to miniaturization for use in applications where size and weight must be held to minimal values.

It is a further object of this invention to provide such a remote control system which is adaptable to the use of noncritical components, thereby increasing the reliability of the system while, at the same time, permitting the reduction of production costs.

It is a still further object of this invention to provide a new and improved remote control system, as above, which is characterized by its relative simplicity, its economy of construction and operation, and its utility over a wide range of applications.

The above and other objects of this invention are achieved in accordance with one illustrative embodiment of the invention in a unique system which utilizes the principle of pulse position modulation in which information data is conveyed by the relative time-positions of a plurality of electrical signal pulses in a pulse grouping of fixed period duration. Those skilled in the art appreciate that with such pulse position modulation techniques, the amplitude and width of these pulses are not critical.

In the specific illustrative embodiment disclosed herein for the purpose of illustrating the principles of the present invention, a three channel system is shown as utilizing four pulses in each pulse grouping, said pulses comprising a synchronizing pulse occurring at a fixed rate and three time-variable pulses. The system coder-transmitter is of a novel construction which provides the time-variable pulses within each pulse grouping at a pulse-time variation determined by the condition of a transducer at the input of each information channel. Thus, in a three channel system, as illustrated herein, three input transducers are employed, with the input of each channel having no effect on the time-variable pulses at the output of the remaining two channels. Acordingly, for three independent transducer inputs, three independent time-variable pulse outputs are present in each coded pulse group to convey the desired information data represented by the state of the input transducers.

The coded pulse groupings from the coder-transmitter may be transmitted to the receiver-decoder in any suitable manner, as by a radio or wire link, to apply the information data to any desired indicating or control utilization devices. In accordance with the embodiment of the invention illustrated herein, the receiver-decoder receives the coded pulse group and synchronizes its operation to the operation of the coder transmitter. Advantageously, the receiver-decoder is comprised of bistable multivibrators capable of providing output electrical signals having durations which are proportional to the time-spacing of the pulses in the coded pulse group. These output electrical signals, which may be in the form of D.C. currents of durations proportional to the input information at the coder-transmitter transducers, then are applied to suitable indicating or control devices to complete the desired function of the system.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1A is a block diagram illustrating the basic principles of operation of the coder-transmitter in the present invention, and FIGURE 1B is a chart illustrating typical information data electrical signal waveforms provided by the coder-transmitter of FIGURE 1A;

FIGURE 2A is a block diagram illustrating the basic principles of operation of the receiver-decoder in the present invention, and FIGURE 2B is a chart illustrating the various operating conditions of the bistable multivibrator comprising the receiver-decoder of FIG. 2B;

FIGURE 3 is a chart illustrating the electrical signal waveforms generated during the receiver-decoder operation for a typical information data pulse grouping;

FIGURE 4 is a block diagram of an illustrative embodiment of remote control system in accordance with the present invention;

FIGURE 5 is a schematic diagram of an illustrative astable multivibrator circuit usable as the pulse source for the coder-transmitter of the system;

FIGURE 6 is a schematic diagram of an illustrative delay circuit and differentiator circuit adaptable for use in the coder-transmitter for providing time-variable pulses representative of the informational state of a transducer input connected thereto;

FIGURE 7 is a schematic diagram of an illustrative pulse amplifier and bistable multivibrator circuit usable in the receiver-decoder of the present invention;

FIGURE 8 is a schematic diagram of an illustrative amplifier-integrator-AND gate-synchronizer circuit adapted to receive the coded pulse groupings from a radio or wire link for application to the pulse amplifier and bistable multivibrator circuit of FIGURE 7;

FIGURE 9 is a schematic diagram of an illustrative output circuit adapted to be connected to the receiver-decoder bistable multivibrators together with a connection table for a system having 15 output channels; and FIGURE 10 is a schematic diagram of an alternative output circuit adapted for use in a remote control system of the invention having only three output channels.

Referring now to the drawing, and more particularly to FIGURES 1A and 1B thereof, there is illustrated the basic principles of operation of a coder-transmitter circuit adapted for use in the remote control system of the present invention. As there shown, a source of electrical pulses such as a multivibrator 10 or the like provides a short duration pulse at the beginning of every fixed pulse group period or cycle. This is indicated in FIGURE 1B as the multivibrator pulses 12. The multivibrator pulses 12 are applied by the conductor 14 to the coder-transmitter output line 16, and also to the delay circuit number 1 and differentiator 18. As explained in detail hereinbelow, the delay circuit number 1 output is a square wave 20 whose width is dependent upon the information state of the transducer input 22. For purposes of illustration, the transducer input will be shown in this description as a variable resistance, and those skilled in the art will appreciate that the transducer input may take any other suitable form, such as a variable voltage source, variable current source, or variable capacitance source, in lieu of the variable resistance, capable of controlling the delay circuit number 1 to provide an output pulse having a width dependent upon the information condition being sensed.

The output pulse 20 of delay circuit number 1 is differentiated in the delay circuit by a differentiator to provide a short duration pulse 24 which is applied over the conductor 26 to the coder output line 16 and to the delay circuit number two and differentiator 28. As shown in FIGURE 1B, the trailing edge of the delay circuit output waveform 20 is differentiated so that the leading edge of the differentiated pulse waveform 24 occurs at the same time as the trailing edge of the delay circuit pulse 20.

The differentiated pulse 24 applied to delay circuit number 2 and differentiator 28 triggers the delay circuit number 2 and provides a square wave 30 whose width is dependent upon the information condition of the transducer input 32 connected to the delay circuit number 2. The delay circuit output pulse 30 is differentiated by the delay circuit number 2 and differentiator 28 to provide a short duration pulse 34 whose leading edge occurs at the same time as the trailing edge of the delay circuit output square wave 30. The differentiated pulse 34 is applied by the conductors 36 to the coded output line 16 and also to the input of delay circuit number 3 and differentiator 38. The operation of delay circuit number 3 and differentiator 38 is identical to the operation of the previous circuits 18 and 28 in that the delay circuit number 3 provides an output pulse 40 whose width is dependent upon the information condition of the transducer input 42 connected to the delay circuit number 3. The delay circuit output pulse 40 is differentiated to provide the short duration pulse 44 whose leading edge occurs at the same time as the trailing edge of the pulse waveform 40. The output of the delay circuit number 3 and differentiator 38 is applied over conductor 46 to the coder output line 16, and this coder output is shown in FIGURE 1B as the sum of the output pulses obtained from the multivibrator 10 and the various delay circuits and differentiators 18, 28 and 38, to thereby provide a pulse grouping of fixed period duration and comprising a synchronizing pulse and three time-variable pulses having a spacing dependent upon the information condition of the input transducers 22, 32, and 42. This pulse grouping is the transmitted waveform from the coder-transmitter and may be applied to the decoder reciver input by any suitable means such as a wire or radio link.

The block diagram and table of FIGURES 2A and 2B illustrate the basic principles of the receiver-decoder utilized in the present invention. As there shown, each of the trigger elements 48 and 50 are cross connected in accordance with well-understood principles to form a bistable multivibrator, identified in FIGURE 2A as binary number 1. Similarly, the trigger elements 52 and 54 are cross connected to form a bistable multivibrator identified in FIGURE 2A as binary number 2.

The output of binary number 1 is connected to the input of binary number 2 such that binary number 1 is triggered to change from one state to another each time an input pulse is received over the input line 66, while binary number 2 is triggered only when element 50 of binary number 1 goes from the cut-off to the conducting state to place a triggering pulse on the connecting lead 68. With such an arrangement of series connected binaries, four unique conditions will exist in the circuit. This is illustrated in FIGURE 2B of the drawing which shows the cut-off and conducting conditions of the elements 48 and 50, 52 and 54 of the binaries for each of the four possible unique conditions.

In accordance with a feature of this invention, a network of diodes and resistances makes use of this four unique state arrangement to provide an output signal having measurable characteristics representative of the information data carried by the time spaced pulses supplied from the coder-transmitter. For example, when the circuit is in condition one, as shown in FIGURE 2B, current will flow only from element 50 of binary number 1 to element 52 of binary number 2 due to the action of the diodes and the relative polarities of the potentials existing in the trigger elements. As such, the output signal will appear only across the terminals of resistance 70 which is connected between trigger elements 50 and 52 by the conductors 56 and 60 and the diode 72. Resistance 66 also is connected between the trigger elements 50 and 52 by the conductors 56 and 60 and the diode 68, but due to the polarized connection of diode 68, current will flow through the resistance 66 only in condition two when trigger element 52 is in the conducting condition and trigger element 50 is in the cut-off condition. The resistance 62 and diode 64 are connected to the trigger elements 50 and 54 by the conductors 56 and 58, and current will flow through resistance 62 only in condition three when the trigger element 50 is in the conducting condition and the trigger element 64 is in the cut-off condition.

Those skilled in the art will appreciate that no output resistance is required for condition four, since its duration of necessity must depend upon the durations of the other three conditions. Accordingly, it can be seen that by the use of a circuit employing the basic principles illustrated in FIGURES 2A and 2B output signals can be provided of distinctive widths or durations which are determined by the time spacing of the input pulses to the decoder circuit.

The operation of the three-channel decoder illustratively disclosed herein is illustrated in the waveform diagram of FIGURE 3 of the drawing. These waveforms illustrate the signal outputs which can be obtained under conditions one, two, three and four, described hereinabove, from a decoder circuit having a typical input pulse grouping. The first waveform in FIGURE 3 shows a typical pulse grouping for one information data cycle received from the coder-transmitter. It will be noted that the first pulse of the pulse grouping is relatively wider than the remaining three pulses, and as explained hereinabove, represents a synchronizing pulse received directly from the pulse source of the coder-transmitter without any delay or differentiating action.

The remaining pulses, pulses two, three and four, are relatively short pulses and are variably time spaced in accordance with the delay action and differentiation provided during the coding function for representing the information data in accordance with pulse position modulation techniques.

The remaining waveforms of FIGURE 3 represent respectively the output signals obtained from the decoder circuit under conditions one, two, three and four, and described hereinabove. It will be noted that the width or duration of the output pulse through the output resistance 70 under condition one is relatively long due to the spacing between the first and second pulses in the input signal pulse grouping. The spacing between the second and third pulses of the input signal pulse grouping is relatively shorter and therefore the output signal on resistance 66 under condition two is likewise relatively shorter in duration. Similarly, the duration of the output signals under conditions three and four are dependent upon the spacing between the third and fourth pulse in the input pulse grouping and the spacing between the fourth pulse and the next synchronizing pulse of the input pulse grouping, respectively.

By varying the spacing between the input pulses in accordance with the desired information data transmitted, the width of the output pulses is similarly varied. The amplitude of the output pulses is maintained at some fixed value since this amplitude function is not a factor in the information data transmission. Since there is only one output pulse in each channel during a pulse grouping time period, the D.C. average output for each channel depends only on the width of these output pulses. In a representative or typical situation, as illustrated in FIGURE 3, this average output appears on the right of the waveforms to clearly show how information data can be decoded into identifiable signals for use with subsequent indicating or circuit controlling devices.

Now that the basic principles of the invention have been explained with respect to FIGURES 1, 2, and 3 hereinabove, the over-all system, construction and operation can be explained by means of the block diagram of FIGURE 4. As there shown, the coder-transmitter is comprised of a pulse source in the form of an astable multivibrator 10 which generates the first or synchronizing pulse of each coded pulse grouping and applies this pulse to the output lines 16 as well as to the delay circuit number one 18 by means of the conductor 14. This pulse is delayed in delay circuit number one by the condition of transducer number one 22 and is differentiated to provide an output pulse on the conductor 26 to the output line 16, and to delay circuit number two 28. The input pulse to delay circuit number two is delayed a time period determined by condition of transducer number two 32 and is differentiated to provide an output pulse on the conductor 36 to the output line 16 and to the delay circuit number three 38. The input pulse to delay circuit number three is delayed in accordance with the condition of transducer number three 42 and this pulse is differentiated to provide an output pulse on conductor 46 to the output line 16. The four pulses in the pulse grouping thus generated, wherein the spacing between the pulses is indicative of the desired information data for each channel, is transmitted by a suitable radio or wire link 74 to the receiver-decoder. The input pulses of the pulse groupings are amplified in amplifier 76 and are applied to an integrator 78 and an AND gate 82.

As well known in the art, AND gates function to provide an output when there is a coincidence of pulse signals on the AND gate input. The integrator output is applied to a synchronizer 80 which has an output connected to the AND gate 82, to synchronize the operation of the receiver-decoder to the operation of the coder-transmitter circuit. Synchronized pulses, still in the form of the coded pulse grouping from the transmitter with its pulse position modulation characteristics, are applied to binary number 1 which is in series with binary number 2 to provide the four unique output conditions described hereinabove with respect to the FIGURES 2 and 3.

Binary number 1 and binary number 2 are connected to the output circuits 84, 86 and 88 in the manner described hereinabove to provide D.C. output signals of identifiable characteristics representative of the information data initially set into the system by the transducers 22, 32 and 42 of the coder-transmitter. Thus, the information data from the transducers has been transmitted to a remote receiver, by means of a radio or wire link, for purposes of remote indication or for purposes of controlling further circuits or mechanisms as desired.

Detailed circuit schematic diagrams representative of illustrative embodiments of the components shown in the block diagram of FIGURE 4 are shown in FIGURES 5 through 10 of the drawing. FIGURE 5 discloses a detail of one particular embodiment of astable multivibrator 10 which advantageously may be used as the pulse source in the coder-transmitter. As there shown, the astable multivibrator may be comprised of transistors 90 and 92 which have their base electrodes cross-connected by means of the capacitors 94 and 96 and their emitter electrodes connected together and returned to the common line through the emitter resistance 98. The collector and base electrodes are returned to the remaining power lead 100 by means of suitable resistors 102 and 104 such that the unsymmetrical astable multivibrator oscillates at a suitable repetition rate consistent with the operating cycle of the system.

Advantageously, the component values for the astable multivibrator may be selected so that the transistor 92 conducts for a short period and is in cut-off condition for a long period. The output of the astable multivibrator is applied through the capacitor 106 to the transistor 108, which serves as an amplifier and pulse shaper. A suitably connected diode 110 is connected to the output of transistor 108 for applying this output pulse to the output line 16 connected to the radio or wire link 74. In addition, the output pulse from the astable multivibrator and amplifier is applied over the output line 14 to the input of the first delay circuit in the coder-transmitter. Thus, the output of the astable multivibrator circuit is a short duration square pulse occurring at the desired repetition rate for the transmission of pulse groupings to the receiver-decoder, and since only one pulse source is required, only one astable multivibrator circuit 10 is used in the remote control system embodying the present invention.

A typical delay and differentiating circuit for determining the variable time spacing of the pulses comprising the coded pulse grouping output of the coder-transmitter is shown in detail in FIGURE 6 of the drawing. Advantageously, this circuit may comprise a temperature-stabilized, saturating monostable multivibrator utilizing the cross-connected transistors 112 and 114 and modified to utilize the variable base-to-B+ resistance 116 as a transducer. The variable resistance 116 of transducer 22 is connected to the junction of the coupling capacitor 118 and the base electrode of transistor 114 in the monostable multivibrator. The input pulses from the pulse source 10 are applied to the delay circuit through the capacitor 120 and diode 122 to the base electrode of transistor 112.

The emitter electrode of transistor 112 is connected directly to the emitter electrode of transistor 114, which in turn is returned through the emitter resistance 124 to the common power lead 126.

In accordance with a well-understood operation of such saturating monostable multivibrator circuits, the time constant of the transducer resistance 116 and the capacitor 118 determines the length of time that the transistor 114 is held in a cut-off condition. Therefore, the circuit makes it possible to attain variable time delay of a desired length or duration at its output. The output from transistor 114 is taken from the transistor collector electrode through the coupling capacitor 128 and is applied to the base electrode of transistor 130 which serves as an amplifier and pulse shaper. The output of transistor 130 is taken through the diode 132 and is applied to the output line 16 in the form of a very narrow pulse, which in one illustrative embodiment of the invention, is of a width no wider than one-tenth the width of the output pulse of the multivibrator. This narrow output pulse on the output line 16 to the radio or wire link is obtained on the relatively wide output pulse of the multivibrator by the differentiating circuit comprised of the capacitor 128 and the resistance 134 at the input to the amplifier transistor 130.

As explained hereinabove, the trailing edge of the multivibrator output pulse is differentiated so that the leading edge of the output pulse on output line 16 occurred at the same time as the trailing edge of the multivibrator output. This is clearly shown in FIGURE 1B of the drawing.

The output to the next succeeding delay circuit in the coder-transmitter is taken from the collector electrode of transistor 112 over the line 26. If desired, means for monitoring the input pulses can be provided in the form of the circuitry shown within the dotted lines in FIGURE 6. These components may include a transistor 136 having its base electrode connected to the output of the monostable multivibrator and having its collector connected through a suitable variable resistance to a milliameter 138 for providing the monitoring indication of the circuit operation.

Manifestly, the circuit for monitoring the input pulses may be eliminated if desired, and as such, this circuit does not form a necessary part of the present invention.

Of the above description of the operation of the delay and differentiating circuit for one channel of the coder-transmitter, it can be seen that the time interval between the input triggering pulse to the monostable multivibrator and the output pulse of the circuit is proportional to the resistance of the transducer 22. While the transducer 22 is shown in the form of a variable resistance 116 which is responsive to the information data condition being sensed, those skilled in the art will readily appreciate that other forms of transducers may be used for controlling the delay between the circuit input and output pulses, such other transducers taking the form of voltage, current, or capacitance variable means to provide the input variable to the multivibrator.

One delay and differentiating circuit, of the type illustrated in FIGURE 6, is required for each channel of the remote control system forming the present invention. In a three channel system, such as that illustrated in FIGURE 4 of the drawing, three such delay circuits would be used. However, this number may be reduced or added to as desired in accordance with the number of information channels desired for the system.

FIGURE 7 discloses one illustrative circuit embodiment of a bistable multivibrator or binary used in the receiver-decoder of the system. As shown in FIGURE 4, in a three information channel system only two such binary circuits are required. The binary circuit shown in FIGURE 7 comprises a triggering pulse amplifier in the form of a transistor 140 which has its base electrode connected through a capacitance to an AND gate 82 in the case of binary number 1, or to the preceding binary in the case of binary number 2. The output of the triggering pulse amplifier transistor 140 is applied from the emitter electrode through the diode 142 to the common emitter electrode terminal of transistors 144, and 146. Transistors 144 and 146 are cross-coupled by a suitable capacitor and resistance to form a temperature-stabilized, saturating, transistor bistable multivibrator.

The temperture stability is provided by the emitter resistor 148, which in one illustrative embodiment of the invention successfully constructed and operated had a value of 220 ohms. In the illustrative circuit successfully tested and operated, the collector current in the transistor which was placed in the conducting or on condition approximated 1.8 milliamperes while the base current therein approximated 150 microamperes. The outputs from the binary are obtainable from their respective collector electrodes at the lines marked A and B respectively in FIGURE 7. As explained hereinabove, these outputs are connected to suitable diode resistance output circuits for providing electrical D.C. signals having a pulse width or duration in each channel corresponding to the information data supplied to the associated channels in the transmitter from the transducer therein. While two binary circuits of the type shown in FIGURE 7 are required for a three channel system, such as that shown in FIGURE 4, three such binaries are required for a seven information channel system, and four such binaries are required for a fifteen information channel system.

The circuit details of an illustrative synchronizer, integrator, AND gate, and amplifier circuit are shown in FIGURE 8 of the drawing. The coded pulse grouping from the transmitter, as communicated through the radio or wire link 74, is applied to the input of the amplifier transistor 150. Transistor 150 forms a part of the saturating amplifier 76 which serves to reshape input pulses in the coded pulse grouping to overcome any loss and noise with may be present in the radio or wire link 74. The output of the saturating amplifier 76 is applied from the transistor 150 to the integrating network comprised of the capacitors 152 and the resistance 154. The output of the saturating amplifier 76 also is applied to the AND gate 82 by means of the resistance 156 which is connected to the base electrode of the AND gate transistor 158. Due to the operation of the integrator 78, the input to the transistor 160 of the synchronizer 80 is the integral of the decoder input pulse grouping. The synchronizer 80 is comprised of the cross-coupled transistors 160 and 162, and is essentially the same circuit as the basic binary except that the commutating capacitors have been deleted and unsymmetrical base triggering is used as the input. Thus, it can be seen that only when a wide pulse is received at the decoder input, will the amplitude be sufficient to trigger the synchronizer binary circuit. When the synchronizer is triggered, the transistor 162 saturates and the transistor 160 will cut-off to permit a positive output to appear at the collector electrode of the AND gate transistor 158 to permit the AND gate to pass the input pulses at its base electrode on to the first binary by means of the output line 164.

An input to the synchronizer is obtained from the differentiated output of the transistor collector electrode A of the last binary in the receiver-decoder. This input, transmitted over the line 166, as shown in FIGURES 4 and 8, is applied through the condenser 168 to the base electrode of transistor 162 of the synchronizer. When the transistor 144 of the last binary goes from the cut-off to the conducting state, a pulse is present on line 166 to trigger transistor 160 of the synchronizer into conduction and thereby drops the output voltage to a very low value which closes the AND gate 82. In this manner, the receiver-decoder is synchronized to the cyclic rate of the coder-transmitter, and turns off after the last binary of the receiver has processed the last pulse in the input pulse grouping. Only one synchronizer, integrator, AND gate, and amplifier circuit of the type shown in FIGURE 8 is required in the remote control system of the invention regardless of the number of information channels being utilized.

The basic principles of the diode network of the system have been explained hereinabove in connection with FIGURES 2 and 3 of the drawing. In the diode output network disclosed in FIGURE 2 it has been found that several limitations are present in the form of very low power output, failure to provide outputs referenced to the power supply, and excessive circuit loading. The output network shown in FIGURE 9 overcomes these difficulties and further, is usable in systems having as many as fifteen different information channels. As shown in FIGURE 9, four diodes, 168, 170, 172 and 174, respectively, are adapted to be connected to their associated binary outputs and also are connected in common through the resistance 176 to the base electrode of transistor 178. The table in FIGURE 6 shows the input connection for any information channel to the proper binary collector electrode. When the collector electrode of any transistor that is connected to one of the inputs of the output circuit under consideration is saturated, transistor 178 will be cut-off and there will be no output. All of the inputs of a given information channel must be positive for an output to appear on the emitter electrode of transistor 178 and hence the unique condition in the binaries corresponding to the information channel must exist for there to be an output in that channel.

One such circuit of the type shown in FIGURE 9 is required for each information channel. If output circuits adapted to handle up to fifteen information channels are not required in the systems design, then a specific output circuit utilizing fewer components may be constructed for a smaller number of channels. Thus, as shown in FIGURE 10, an alternate output circuit arrangement usable with a three channel system only may be adopted for this specific use. In such an alternate output circuit arrangement, the input line 180 receives the output from the collector electrode B of binary number 2 and applies it to the base electrode of transistor 182. The output of transistor 182 is applied to the base electrode of transistor 184, and the output of transistor 184 is a D.C. signal representative of the information data in information channel one. Similarly, the input line 186 is connected to the base electrode of transistor 188, which in turn applies its output to the base electrode of transistor 190. The output of transistor 190 is a D.C. electrical signal representative of the channel two information data. In a similar fashion the input line 192 is applied to the base electrode transistor 194 which in turn applies its output to the base electrode of transistor 196, the output of which is a D.C. electrical signal representative of the channel three information data.

Thus, there has been disclosed and described a unique remote control system for transmitting information data in the form of pulse position modulated signals over a radio or wire link to a remotely located decoder receiver. The coded pulse groupings are pulse positioned modulated to provide variable pulse spacings in accordance with the information data presented by input transducers connected to the transmitter delay circuit. These variable spaced pulse groupings are decoded in the receiver to reconstruct the information data in the respective channels in the form of D.C. output signals suitable for operating remote indicators or controlling devices. In an illustrative system constructed in accordance with the invention, the system synchronized itself whenever it was turned on and remained fully synchronized during operation to provide accurate, efficient, and relatively inexpensive means for transmitting information data to remotely located indicating or controlling devices.

While there has been shown and described a specific embodiment of the present invention, it will, of course, be understood that various modificatitons and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of a remote control system comprising in combination a coder-transmitter circuit including a source of pulses occurring at a fixed cyclic rate, a plurality of sequentially connected, selectively controlled delay circuits, a common output line connected to the outputs of said pulse source and said delay circuits, means connecting said pulse source to a first delay circuit of said sequentially connected delay circuits such that a pulse is applied from said pulse source to said common output line and to said first delay circuit for each information data cycle to be transmitted, said pulse being applied after a first selectively controlled delayed time in said first delay circuit to said common output line and to a second one of said delay circuits and, after a second selectively controlled delayed time in the second delay circuit, to said common output line and a third one of said delay circuits, and after a third selectively controlled delayed time in the third delay circuit to said common output line, until the pulse has travelled through all of said delay circuits in succession to provide a group of time-spaced pulses on said common output line for each information data cycle, relay controller means connected to each of said selectively controlled delay circuits to vary its delay period in accordance with the information data to be transmitted thereby varying the time spacing of the pulses in the pulse group to represent said information data by pulse position modulation, a receiver-decoder for said pulse group associated with said coder-transmitter by a communications link, said receiver-decoder comprising synchronizing means responsive to the first pulse of said pulse group for synchronizing the operation of said receiver-decoder with the cyclic operation of said coder-transmitter, a plurality of bistable trigger circuits connected to said synchronizing means, the stable state conditions of said bistable trigger circuits being controlled by the relative time positions of the pulses in said pulse group, and output circuits connected to the outputs of said bistable trigger circuits for providing output electrical signals having average values determined by the stable state condition of said bistable trigger circuits, there being a unique output electrical signal for each different combination of bistable trigger circuit conditions to thereby represent the information data at the coder-transmitter during each cycle of operation.

2. The improvement of a remote control system comprising in combination a coder-transmitter circuit including a source of pulses occurring at a fixed cyclic rate, a plurality of sequentially connected selectively controlled delay circuits, there being one delay circuit for each information channel, a common output line connected to the outputs of said pulse source and said delay circuits, means connecting said pulse source to a first delay circuit of said sequentially connected delay circuits to enable a pulse to travel through all of said selectively controlled delay circuits in succession to provide a group of time-spaced pulses on said common output line for each information data cycle, delay controller means connected to each of said selectively controlled delay circuits to vary its delay period in accordance with the information data to be transmitted thereby varying the time spacing of the pulses in the pulse group to represent said information data by pulse position modulation, a receiver-decoder for said pulse group associated with said coder-transmitter by a communications link, said receiver-decoder comprising synchronizing means responsive to the first pulse of said pulse group for synchronizing the operation of said receiver-decoder with the cyclic operation of said coder-transmitter, a plurality of bistable trigger circuits connected to said synchronizing means, the stable state conditions of said bistable trigger circuits being controlled by the relative time positions of the pulses in said pulse group, and output circuits connected to the outputs of said bistable triger circuits for providing output electrical signals for each information channel having values determined by the stable state condition of said bistable trigger circuits, there being a unique output electrical signal for each different combination of bistable trigger circuit conditions to thereby represent the information data present at the coder-transmitter during each cycle of operation.

3. The improvement of a remote control system comprising in combination a coder-transmitter circuit including a source of pulses occurring at a fixed cyclic rate, a plurality of sequentially connected, selectively controlled delay circuits, a common output line connected to the outputs of said pulse source and said delay circuits, means connecting said pulse source to a first delay circuit of said sequentially connected delay circuits to enable a pulse to travel through all of said selectively controlled delay circuits in succession to provide a group of time-spaced pulses on said common output line for each information data cycle, transducer means connected to each of said selectively controlled delay circuits to vary its delay period in accordance with the information data to be transmitted thereby varying the time spacing of the pulses in the pulse group to represent said information data by pulse position modulation, a receiver-decoder for said pulse group associated with said coder-transmitter by a communication link, said receiver-decoder comprising synchronizing means responsive to the first pulse of said pulse group for synchronizing the operation of said receiver-decoder with the cyclic operation of said coder-transmitter, a plurality of bistable trigger circuits connected to said synchronizing means, the stable state conditions of said bistable trigger circuits being controlled by the relative time positions of the pulses in said pulse group, and output circuits connected to the outputs of said bistable trigger circuits for providing output electrical signals for each information channel having average values determined by the stable state condition of said bistable trigger circuits, there being a unique output electrical signal for each different combination of bistable trigger circuit conditions to thereby represent the information data present at the coder-transmitter during each cycle of operation.

4. The improvement of a remote control system in accordance with claim 3 wherein said transducer means comprises a variable resistor whose resistance is varied in accordance with the information data to be transmitted in the associated information channel.

5. The improvement of a remote control system comprising in combination a coder-transmitter circuit including a source of pulses occurring at a fixed cyclic rate, a plurality of sequentially connected transducer controlled variable delay circuits, a common output line conected to the outputs of said pulse source and said delay circuits, means connecting said pulse source to a first delay circuit of said sequentially connected delay circuits to enable a pulse to travel through all of said transducer controlled delay circuits in succession to provide a group of time-spaced pulses on said common output line for each information data cycle, the time spacing of the pulses in the pulse group representing said information data by pulse position modulation, a receiver-decoder for said pulse group associated with said coder-transmitter by a communications link, said receiver-decoder comprising synchronizing means responsive to the first pulse of said pulse group for synchronizing the operation of said receiver-decoder with the cyclic operation of said coder-transmitter a plurality of bistable trigger circuits connected to said synchronizing means, the stable state conditions of said bistable trigger circuits being controlled by the relative time positions of the pulses in said pulse group, and output circuits connected to the outputs of said bistable trigger circuits for providing output electrical signals having values determined by the stable state condition of said bistable trigger circuits, there being a unique output electrical signal for each different combination of bistable trigger circuit conditions to thereby represent the information data present at the coder-transmitter during each cycle of operation.

6. The improvement of a remote control system in accordance with claim 5 wherein said synchronizing means comprises an AND gate and an integrator network connected to said communications link for receiving said pulse group, a synchronizer connected to the output of said integrator and the last one of said bistable trigger circuits, and means connecting the output of said synchronizer to said AND gate whereby said AND gate operates to transmit said pulse group to said bistable trigger circuits only when signals are applied simultaneously thereto from said communications link and said synchronizer.

7. The improvement of a remote control system in accordance with claim 5 wherein each of said variable delay circuits comprise a monostable multivibrator having a time constant determined by an input variable from a transducer in accordance with the information data to be transmitted in the associated information channel.

References Cited by the Examiner

UNITED STATES PATENTS

| | | | |
|---|---|---|---|
| 2,468,703 | 4/1949 | Hammel | 340—184 |
| 2,525,893 | 10/1950 | Gloess | 340—206 |
| 2,605,360 | 7/1952 | Trevor | 179—15 |
| 2,769,166 | 10/1950 | Gloess | 340—206 |
| 2,832,657 | 5/1958 | Bantelink | 179—15 |
| 2,842,759 | 7/1958 | Keynon | 340—206 |
| 3,132,329 | 5/1964 | Penter | 340—183 |

NEIL C. READ, *Primary Examiner.*

T. A. HABECKER, *Examiner.*